United States Patent [19]

Racciato et al.

[11] 4,155,885

[45] May 22, 1979

[54] AMPHOTERIC GRAFT COPOLYMERS OF XANTHOMONAS HYDROPHILIC COLLOID AND PARTIALLY N-AMINOMETHYLATED ACRYLAMIDE

[75] Inventors: Joseph S. Racciato, San Diego; Ian W. Cottrell, Solana Beach; Jaewon L. Shim, San Diego, all of Calif.

[73] Assignee: Merck & Co., Inc., Rahway, N.J.

[21] Appl. No.: 901,179

[22] Filed: Apr. 28, 1978

[51] Int. Cl.$^2$ ................................................ C08L 5/00
[52] U.S. Cl. ........................ 260/17.4 GC; 162/168 R; 162/168 NA; 260/17.3; 260/17.4 ST
[58] Field of Search ................................. 260/17.4 GC

[56] References Cited

U.S. PATENT DOCUMENTS

| 3,708,446 | 1/1973 | Pettitt | 260/17.4 GC |
|---|---|---|---|
| 3,864,312 | 2/1975 | Suzuki et al. | 162/168 NA |
| 3,897,333 | 7/1975 | Field et al. | 162/168 NA |
| 3,907,758 | 9/1975 | Sackmann et al. | 162/168 NA |
| 3,947,392 | 3/1976 | Lang et al. | 260/17.4 GC |

FOREIGN PATENT DOCUMENTS 1413301  11/1975  United Kingdom ................. 536/50

*Primary Examiner*—Edward M. Woodberry
*Attorney, Agent, or Firm*—Gabriel Lopez; Julian S. Levitt

[57] ABSTRACT

A series of novel amphoteric graft copolymers of xanthomonas hydrophilic colloid and partially N-aminoalkylated acrylamide has been prepared by reacting the corresponding acrylamide copolymer with an alkyl amine and an active aldehyde. The new copolymer is cationized via acidification or quaternization, and is reverted to its anionic form via basification.

13 Claims, No Drawings

AMPHOTERIC GRAFT COPOLYMERS OF XANTHOMONAS HYDROPHILIC COLLOID AND PARTIALLY N-AMINOMETHYLATED ACRYLAMIDE

BACKGROUND OF THE INVENTION

This invention relates to graft copolymers of xanthomonas hydrophilic colloid and partially N-aminoalkylated acrylamide. The xanthomonas colloid is an anionic heteropolysaccharide containing mannose, glucose, and glucuronic acid groups. The copolymerization of the anionic polymer with acrylamide is known and its method of preparation is described in the U.S. Pat. No. 3,708,446. However, these copolymers are quite stable in aqueous media to changes in pH ranging from 2 to 12 indicating that they are very weak ionic polymers. It is desirable to create an amphoteric polymer which can be used either as a cationic polymer or an anionic polymer.

To create the desired new and easily ionizable copolymers, the amino functions of the acrylamides present in the xanthomonas colloid-acrylamide copolymers are partially converted to aminoalkylamines via Mannich reaction. Although the method has been applied to polyacrylamide, it has not been used in modifying any of the xanthomonas-acrylamide copolymers which incorporate all the xanthomonas heteropolysaccharide functional groups such as hydroxyl, carboxyl, ester and ketal. Surprisingly, these active functional groups have not interfered with the aminoalkylation.

Therefore it is an object of the present invention to generate new amphoteric graft copolymers of xanthomonas hydrophilic colloid and partially N-aminoalkylated acrylamide which retain many of the desirable characteristics of the anionic heteropolysaccharide xanthomonas colloid while at the same time, having the desirable cationic characteristics of the N-aminoalkylated acrylamide.

An additional object of this invention is to provide a suitable aminoalkylation process under well-controlled conditions for the creation of these novel copolymers.

DETAILED DESCRIPTION OF THE INVENTION

The novel amphoteric copolymers of this invention are graft copolymers of xanthomonas hydrophilic colloid and partially N-aminoalkylated acrylamide in which the weight ratio of xanthomonas colloid to the acrylamide (ZN:AM) ranges between 1:1 to 1:10, and wherein in each of the new polymers, the percentage of the N-aminoalkylated acrylamide (NAM%) groups ranges from 30% to 85% of the total available acrylamide groups.

The N-aminoalkylated acrylamide function is defined in formula 1,

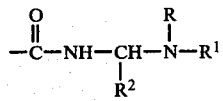

which is cationized via acidification to form an acid addition salt of formula 2, or quaternization to form the quaternary salt of formula 3,

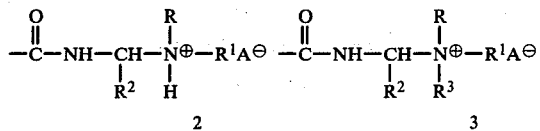

wherein R and $R^1$ are independently lower alkyl especially $C_{1-6}$ alkyl; $R^2$ is hydrogen, lower alkyl especially $C_{1-6}$ alkyl, or benzyl; $R^3$ is lower alkyl especially $C_{1-6}$ alkyl, or benzyl; and $A^\ominus$ is an anion of a strong acid such as hydrochloric acid, hydrobromic acid, hydroiodic acid, sulfuric acid, phosphoric acid, trichloroacetic acid, trifluoroacetic acid, P-tolnoylsulfonic acid, 2,4-dinitrophenyl sulfonic acid, or the like.

First, with regard to the weight ratio of the xanthomonas colloid to the acrylamide (ZN:AM), the preferred form of the copolymers of this invention is that wherein the weight ratio ZN:AM is from 1:1 to 1:5 especially from 1:1 to 1:3 for higher aqueous viscosity.

Second, concerning the percentage of the N-aminoalkylated acrylamide of the total available acrylamide groups (NAM%), the preferred form of the copolymers of this invention is that wherein the percentage, NAM%, ranges from 45% to 55%.

Third, regarding the N-aminoalkylated acrylamide function, the preferred form of the copolymers of the present invention is that wherein R and $R^1$ represent independently $C_{1-3}$ alkyl such as methyl, ethyl or propyl; $R^2$ represents hydrogen, methyl or benzyl; $R^3$ represents $C_{1-4}$ alkyl such as methyl, ethyl, propyl or butyl; and $A^\ominus$ is a halide anion such as chloride, bromide, or iodide.

A still more preferred version of this invention is that wherein R and $R^1$ are both methyl; $R^2$ is hydrogen; $R^3$ is methyl; and $A^\ominus$ is chloride.

The aminoalkylation is carried out in an inert solvent such as water, a lower alkanol such as methanol, ethanol, a di(lower alkyl)ketone such as acetone, methyl ethyl ketone or diethyl ketone, a lower alkyl lower alkanoate such as methyl or ethyl acetate or the like, or mixtures thereof. The process comprises the treatment of a suitable copolymer with a dialkylamine of the formula

wherein R and $R^1$ are as previously defined, at about 25° C. to about 100° C. preferably about 65° C. to 75° C. for a sufficient length of time, usually 10–60 min. followed by subsequent treatment with an aldehyde of the formula $R^2$CHO, wherein $R^2$ is as previously defined, at about 25° C. to about 100° C., preferably 65° C. to 75° C. until the reaction is complete, usually about 15 min. If desired, the resulting product is then cationized by (1) addition of a strong acid of formula HA wherein the anion thereof, $A^\ominus$, is as previously defined to form the acid addition salt of formula 2; or (2) quaternization with an appropriate reagent such as an alkyl halide of the formula $R^3A_\alpha$ is selected from chloride, bromide or iodide. Again if desired, the resulting quaternary halide form (2) is basified with a strong base such as sodium hydroxide, potassium hydroxide, ammonium hydroxide or the like, to form the corresponding quaternary hydroxide of partial formula

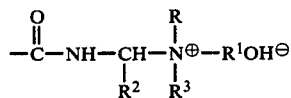

followed by salt formation with a strong acid HA to form the quaternary salt of formula 3.

Similarly upon basification with an inorganic base such as sodium hydroxide, sodium bicarbonate, potassium carbonate, and ammonium hydroxide, or the like, the ammonium salts of the new copolymers of formula 2, are reverted to their anionic forms containing the N-acrylamidoalkylamine function as shown in formula 1. While in the meantime the glucuronic acid molecules contained in the xanthomonas colloid are converted to carboxylate salts.

The new copolymers are used as retarding or leveling agents in dyeing textiles such as acrylic fabrics. Usually a 0.5% to 1.5% solution of the copolymer, based on the weight of the fabric to be dyed, containing 0.25% to 1.0% of the dye, also based on the weight of the fabric to be dyed, in a polar solvent such as water, methanol, ethanol, acetone or aqueous solutions thereof is adjusted to a pH value required by the dye used, with a weak acid such as acetic acid, propionic acid or the like. The fabric is then immersed in this solution and the entire mixture is heated to reflux until the dyeing process is completed, usually about 1 hour to about 2 hours.

Other uses of the new copolymers include flocculants or pigment retention aids in paper manufacturing or coagulant aids or agglomerating agents in water treatment.

EXAMPLE 1

To a solution of 8.0 g of xanthomonas hydrophilic colloid-acrylamide (1:3) copolymer in 300 ml. of water at 70° C. is added 19.0 g. of 40% aqueous dimethylamine. The reaction solution is stirred for about 5 minutes before 5.8 g. of paraformaldehyde is added slowly. After the addition is completed, the reaction mixture is stirred for an additional 20–40 minutes, and then cooled to 55° C. While stirring, 6.0 g. of ammonium chloride and 8.4 g. of concentrated hydrochloric acid are added and the mixture is stirred for an additional 30 minutes before it is cooled to room temperature and diluted with 600 ml. of acetone to precipitate the product. After filtration, it is dried in vacuo at 50° C. and then milled to 11.3 g. (65%) of a 40 mesh powder which was insoluble in water, showed ir bands at 3050 cm$^{-1}$ (NH$_4{}^+$), 1670 cm$^{-1}$ and 1550 cm$^{-1}$ $$\overset{O}{\underset{}{\|}}\overset{H}{\underset{}{}} \\ (-C-N-).$$

Based on the % weight add-on (41.3%), it is estimated that 35.3% of the original acrylamide function has been aminomethylated.

EXAMPLE 2

In the similar manner as described in Example 1, 12.0 g. of xanthomonas hydrophilic colloid-acrylamide (1:1) copolymer is treated with 19 g. of 40% dimethylamine and 5.8 g. of paraformaldehyde to afford 15 g. (70.4%) of a new copolymer which is insoluble in water. Based on the % weight add-on (25%), it is estimated that 32.3% of the original acrylamide function has been aminomethylated.

EXAMPLE 3

In the similar manner as described in Example 1, 7.2 g. of xanthomonas hydrophilic colloid-acrylamide (1:5) copolymer is treated with 40% aqueous dimethylamine (19 g.) and paraformaldehyde (5.8 g.) to afford 14.9 g. (89.9%) of a new, water soluble copolymer in which 82.8% of the existing acrylamide is dimethylaminomethylated. The viscosity of a 1% aqueous solution of the product was 25 cps.

Employing the same procedures as described in Examples 1, 2 and/or 3, but substituting for the copolymers, aldehydes and amines used therein similar stoichiometric amounts of the copolymers, aldehydes and amines as defined below in Table I, a series of new aminoalkylated copolymers are prepared according to the previously described process as summarized below in equations (1), (2) and (3):

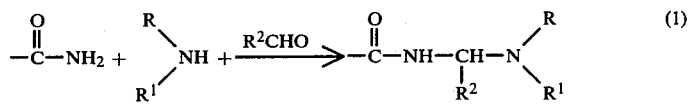

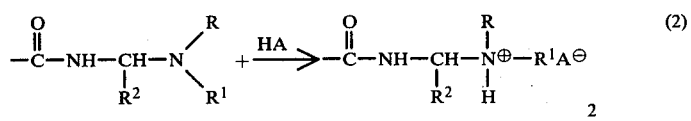

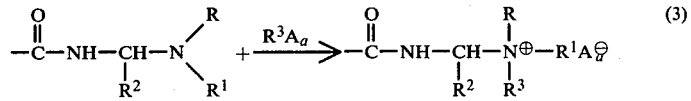

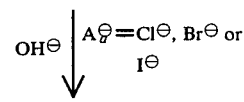

-continued

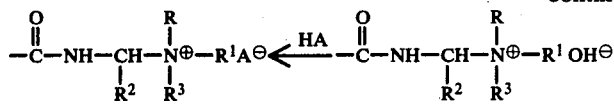

A selected group of these new copolymers are described below in Table I:

TABLE I

| ZN:AM Weight ratio | Weight % NAM % | R | R$^1$ | R$^2$ | Acid Addition Salt (2) A$^\ominus$ | Quaternary Salt (3) R$^3$ | A$^\ominus$ |
|---|---|---|---|---|---|---|---|
| 1:1 | 30–40 | C$_2$H$_5$ | N-C$_4$H$_9$ | CH$_3$ | Cl$^\ominus$ | C$_2$H$_5$ | Cl$^\ominus$ |
| 1:2 | 40–50 | n-C$_3$H$_7$ | n-C$_3$H$_7$ | C$_2$H$_5$ | Br$^\ominus$ | n-C$_3$H$_7$ | Br$^\ominus$ |
| 1:3 | 50–60 | i-C$_3$H$_7$ | n-C$_4$H$_9$ | n-C$_3$H$_7$ | I$^\ominus$ | CH$_3$ | I$^\ominus$ |
| 1:4 | 60–70 | n-C$_4$H$_9$ | C$_6$H$_5$CH$_2$ | n-C$_4$H$_9$ | CF$_3$COO$^\ominus$ | n-C$_4$H$_9$ | HSO$_4^\ominus$ |
| 1:5 | 70–80 | n-C$_5$H$_{11}$ | C$_2$H$_5$ | n-C$_5$H$_{11}$ | CCl$_3$COO$^\ominus$ | CH$_3$ | H$_2$PO$_4^\ominus$ |
| 1:6 | 75–85 | i-C$_5$H$_{11}$ | cyclohexyl | n-C$_6$H$_{13}$ | HSO$_4^\ominus$ | i-C$_4$H$_9$ | CF$_3$COO$^\ominus$ |
| 1:7 | 75–85 | n-C$_6$H$_{13}$ | CH$_3$ | H | H$_2$PO$_4^\ominus$ | i-C$_5$H$_{11}$ | CCl$_3$COO$^\ominus$ |
| 1:8 | 75–85 | cyclohexyl | cyclohexyl | H | CH$_3$–C$_6$H$_4$–SO$_3^\ominus$ | cyclohexyl | CH$_3$–C$_6$H$_4$–SO$_3^\ominus$ |
| 1:9 | 75–85 | i-C$_4$H$_9$ | C$_6$H$_5$CH$_2$ | C$_6$H$_5$CH$_2$ | O$_2$N–C$_6$H$_3$(NO$_2$)–SO$_3^\ominus$ | C$_6$H$_5$CH$_2$ | O$_2$N–C$_6$H$_3$(NO$_2$)–SO$_3^\ominus$ |
| 1:10 | 75–85 | CH$_3$ | t-C$_4$H$_9$ | C$_6$H$_5$CH$_2$ | Cl$^\ominus$ | C$_6$H$_5$CH$_2$ | Cl$^\ominus$ |

What is claimed is:

1. Amphoteric graft copolymers of xanthomonas hydrophilic colloid and partially N-aminoalkylated acrylamide wherein the amidoalkylamino function has the formula:

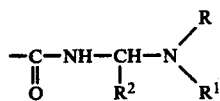

or the acid addition salts thereof of the formula:

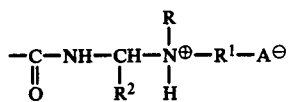

or the quaternary salts thereof of the formula:

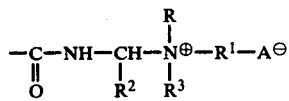

wherein R and R$^1$ are independently lower alkyl; R$^2$ is hydrogen, lower alkyl, or benzyl; R$^3$ is lower alkyl, or benzyl; and A$^\ominus$ is an anion of a strong acid, wherein the weight ratio of xanthomonas hydrophilic colloid to the acrylamide (ZN:AM) ranges between 1:1 to 1:10, and wherein the percentage of the amidoalkylamine function based on the total available acrylamide groups (NAM%) ranges 30–85%.

2. The acid addition salts of the copolymers of claim 1 wherein A$^\ominus$ is chloride, bromide or iodide.

3. The quaternary salts of the copolymers of claim 1 wherein R$^3$ is C$_{1-4}$ alkyl, and A$^\ominus$ is chloride, bromide or iodide.

4. The copolymers of claim 1 wherein the ZN:AM ranges between 1:1 to 1:5.

5. The copolymers of claim 1 wherein the ZN:AM ranges between 1:1 to 1:3.

6. The copolymers of claim 1 wherein the NAM% is 45% to 55%.

7. The copolymers of claim 1 wherein R and R$^1$ are independently C$_{1-3}$ alkyl and R$^2$ is hydrogen, methyl, or benzyl.

8. The copolymers of claim 1 wherein R and R$^1$ are both methyl and R$^2$ is hydrogen.

9. The acid addition salts of the copolymer of claim 8 wherein A$^\ominus$ is chloride, bromide or iodide.

10. The acid addition salt of the copolymers of claim 8 wherein A$^\ominus$ is chloride.

11. The quaternary salt of the copolymers of claim 8 wherein R$^3$ is C$_{1-4}$ alkyl, and A$^\ominus$ is chloride, bromide or iodide.

12. The quaternary salt of the copolymers of claim 8 wherein R$^3$ is methyl, A$^\ominus$ is chloride.

13. A process for preparation of grafted copolymers of xanthomonas hydrophilic colloid and partially N-aminoalkylated acrylamide wherein the N-aminoalkylated acrylamide function has the formula:

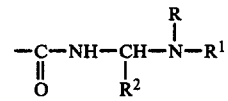

comprising reacting a xanthomonas hydrophilic colloid-acrylamide graft copolymer wherein the weight ratio of xanthomonas hydrophilic colloid to acrylamide (ZN:AM) ranges between 1:1 to 1:10, with a dialkylamine of formula

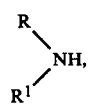

wherein R and R$^1$ are independently lower alkyl, and an aldehyde of formula:

R²CHO wherein R² is hydrogen or lower alkyl, in an inert solvent followed, if desired, by cationization with (1) an acid of formula HA to form an acid addition salt of partial formula

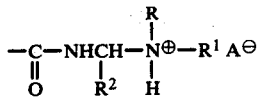

wherein A⊖ is an anion of a strong acid, or (2) with an alkyl halide of formula R³A_α to form a quaternary salt of partial formula

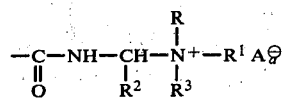

wherein R³ is lower alkyl or benzyl, and A⁻_α is chloride, bromide or iodide, followed, if desired, by basification with a strong base to form a quaternary hydroxide of partial formula:

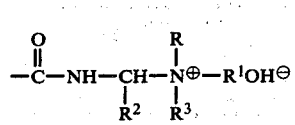

followed by salt formation with a strong acid of formula HA to produce the quaternary salt of partial formula

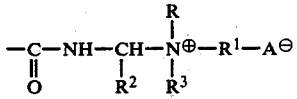

* * * * *